F. R. WILLSON, Jr.
CONVEYER.
APPLICATION FILED OCT. 30, 1908. RENEWED MAR. 12, 1915.

1,156,385. Patented Oct. 12, 1915.

Witnesses
George R. Bliss
B. F. Brann

Inventor
F. R. Willson Jr.
By H. H. Bliss
Attorney

UNITED STATES PATENT OFFICE.

FREEMAN R. WILLSON, JR., OF COLUMBUS, OHIO, ASSIGNOR TO THE JEFFREY MANUFACTURING CO., A CORPORATION OF OHIO.

CONVEYER.

1,156,385.      Specification of Letters Patent.      Patented Oct. 12, 1915.

Original application filed August 3, 1905, Serial No. 272,597. Divided and this application filed October 30, 1908, Serial No. 460,319. Renewed March 12, 1915. Serial No. 13,971.

*To all whom it may concern:*

Be it known that I, FREEMAN R. WILLSON, Jr., a citizen of the United States, residing at Columbus, in the county of Franklin and State of Ohio, have invented certain new and useful Improvements in Conveyers, of which the following is a specification, reference being had therein to the accompanying drawing.

My invention relates to that class of conveyers in which idler pulleys or rollers are employed for giving to a conveying-belt a trough-like form for the purpose of better retaining the material conveyed within the edges of the belt.

The object of the invention is to provide improved means for tilting the idler pulleys but more particularly means for unloading the material conveyed at any desired point.

Figure 1:
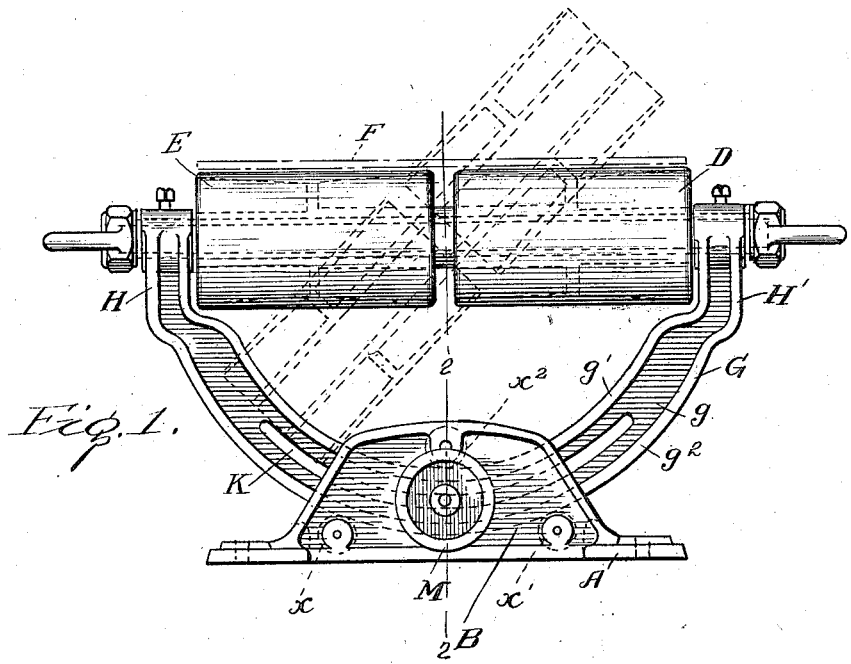
Figure 2:
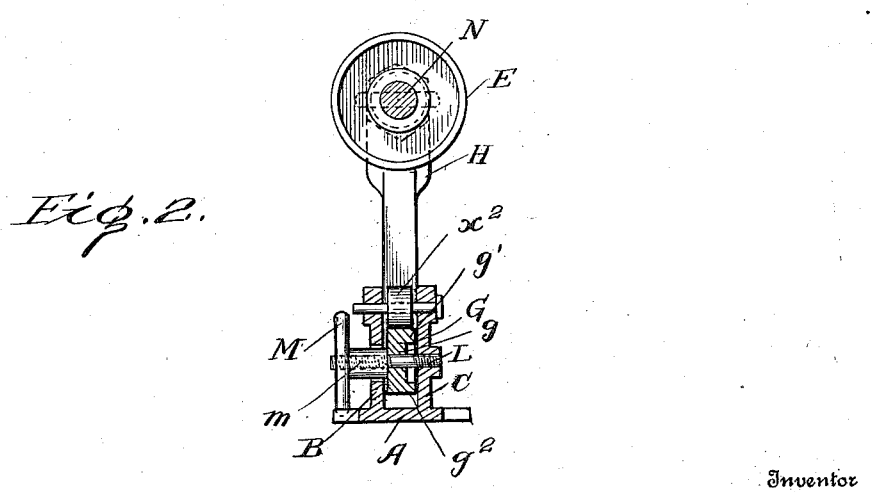

In the drawings,—Figure 1 is a side elevation of a structure embodying my invention. Fig. 2 is a sectional view of the same taken on the line 2—2, Fig. 1.

I have shown my invention as embodied in connection with pulley-supports for a flat-face conveyer.

The lower stationary frame, consisting of the base portion A, and the vertical walls B, C, afford a guideway or channel for the movement of the adjustable frame G. The frame G has a web portion $g$, and upper and lower flanges $g'$, $g^2$, and is arc-shaped in side elevation. The frame G has upwardly extending arms H, H', which afford bearings in which a shaft N is journaled, said shaft carrying the pulleys D, E which afford a support for a flat-face conveyer F. The frame G is provided with a curvilinear slot K, which extends through the greater part of the length of the frame, and is preferably the arc of a circle. The frame is fitted and movable between the walls B, C, as a guideway, and bears on anti-friction rollers $x$, $x'$, which are mounted in the lower part of the base frame and between the walls B, C, thereof. The axes of these rollers are arranged in a circle concentric with the said slot K.

$x^2$ is an anti-friction roller, likewise mounted between the vertical walls B, C, and arranged to bear upon and maintain the frame G in rolling engagement with the rollers $x$, $x'$. For this purpose the axis of the roller $x^2$ is preferably in a vertical plane midway between the vertical planes of the axes of the rollers $x$, $x'$.

A screw threaded pin L, extends through the vertical walls B, C, and the slot K, and a hand wheel M, with its elongated hub-portion $m$ serves to clamp the frame in any adjusted position desired.

It will be understood that the frame G is, by reason of the rollers $x$, $x'$ and $x^2$, adjustable only in the arc of a circle, that is to say, it is bodily adjustable, but is not capable of pivotal adjustment about a point within the slot K. To incline the pulleys at an angle to the horizontal so as to tilt the conveyer belt, the hand wheel is unloosened and the slotted frame G can then be readily moved to any position desired.

This application is a division of my application 272,597, filed Aug. 3, 1905.

What I claim is,—

1. In a conveyer belt support, the combination of a stationary base, a pulley carrying frame mounted to have pivotal movement relative to the said stationary base about an axis parallel to a supported belt, said frame of a semicircular form consisting in cross section of a web with upper and lower flanges, anti-friction rollers mounted in the base and engaging the upper and lower flanges of the pulley carrying frame, the web of said frame being provided along a portion of its center line with a curvilinear slot, and means for clamping said web section to the base portion, substantially as set forth.

2. In a conveyer belt support, the combination of a pulley carrying frame having an arcuate supporting bar centered about an axis parallel with a supported belt and provided with a concentric arcuate slot, a stationary main frame having two parallel vertical walls on each side of the supporting bar, pins extending perpendicularly between the walls, pulleys on the pins in engagement with the outer and the inner curved surfaces of the supporting bar, and a device for locking the carrying frame in adjusted position.

In testimony whereof I affix my signature, in presence of two witnesses.

FREEMAN R. WILLSON, JR.

Witnesses:
M. W. SHERWOOD,
H. B. ALEXANDER.